United States Patent [19]

Knudson

[11] Patent Number: 4,811,587

[45] Date of Patent: Mar. 14, 1989

[54] APPARATUS FOR MAKING PANELS

[76] Inventor: Gary A. Knudson, 17356 W. 57th Ave., Golden, Colo. 80401

[21] Appl. No.: 114,460

[22] Filed: Oct. 28, 1987

[51] Int. Cl.[4] .............................................. B21D 5/08
[52] U.S. Cl. ...................................... 72/181; 72/131; 83/636
[58] Field of Search ................. 72/181, 180, 161, 129, 72/131; 83/636, 620

[56] References Cited

U.S. PATENT DOCUMENTS

| | | | |
|---|---|---|---|
| 1,161,705 | 11/1915 | Lloyd | 83/636 |
| 2,176,115 | 10/1939 | Yoder | 72/181 |
| 2,346,990 | 4/1944 | Oftedal et al. | 72/181 |
| 3,119,296 | 1/1964 | Foster | 83/636 |
| 3,771,401 | 11/1973 | Jasinski | 83/636 |
| 3,886,779 | 6/1975 | McClain | 72/181 |
| 4,218,946 | 8/1980 | Witzler | 83/636 |
| 4,471,641 | 9/1984 | Mitchell | 72/181 |
| 4,549,422 | 10/1985 | Harrow | 72/131 |

FOREIGN PATENT DOCUMENTS 1777039 10/1971 Fed. Rep. of Germany ........ 72/181

Primary Examiner—Daniel C. Crane
Attorney, Agent, or Firm—Fields, Lewis, Pittenger & Rost

[57] ABSTRACT

An apparatus for making a panel, preferably a panel having a base and two sidewalls extending from opposite sides of the base and having lateral flanges. The apparatus includes a frame having a series of sets of forming rollers for forming flat sheet metal into the panel. A partially formed panel rests on a pair of spaced base dies, with the sidewalls supported by two pairs of spaced support dies. A shearing blade is driven in a reciprocating motion between a raised position and a lowered position moving past the dies to shear the panel. Preferably, the cutting edge of the blade includes a series of concave serrations along its length, with each serration having an arc terminating in an apex at both ends. The pairs of support dies are removably mounted so that they may be replaced by other die pairs to provide support for different configurations of panel sidewalls and edge flanges. In addition, one of the pairs of support dies is laterally adjustable to accommodate panels of different widths.

8 Claims, 7 Drawing Sheets

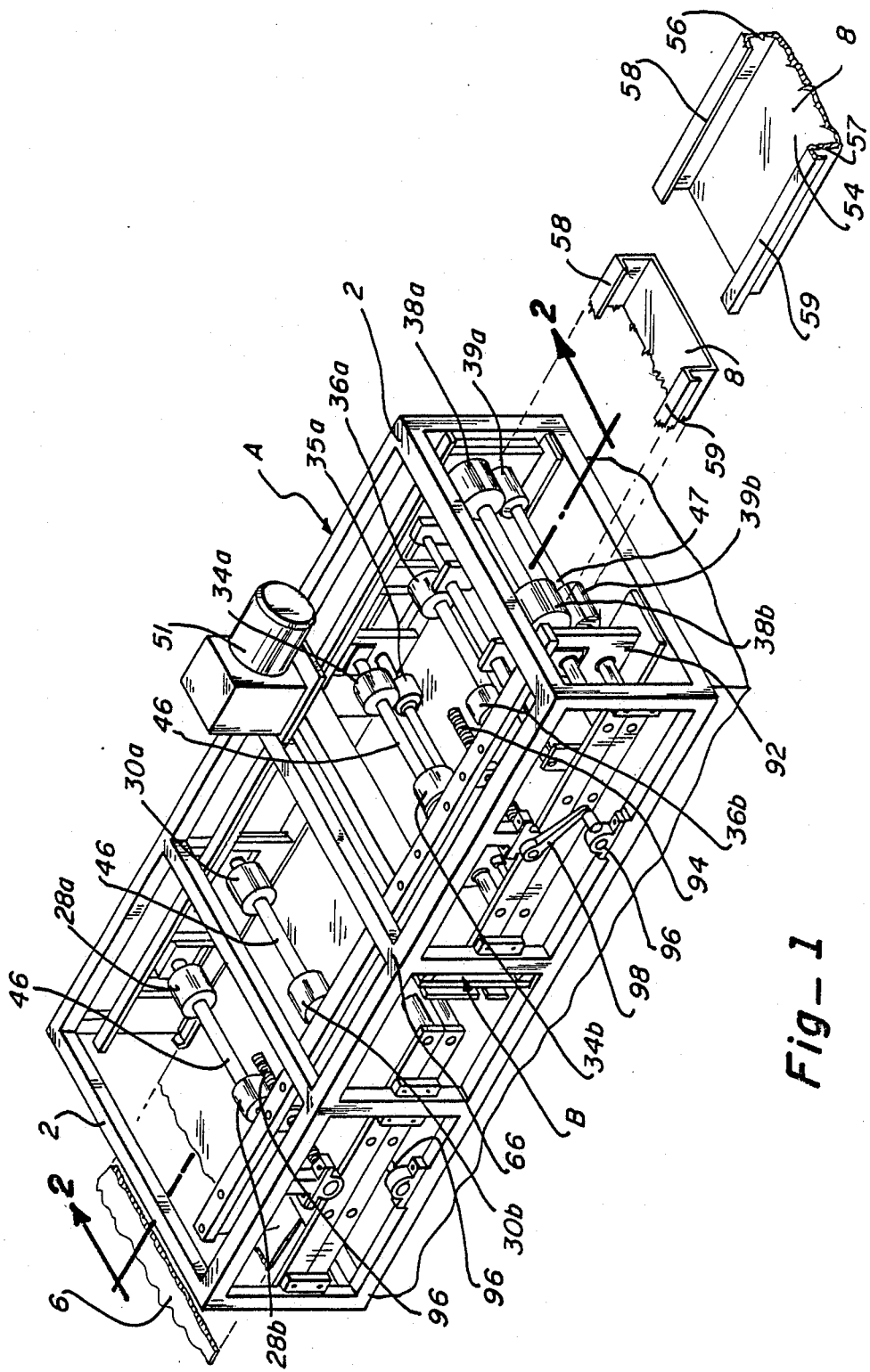
Fig_1

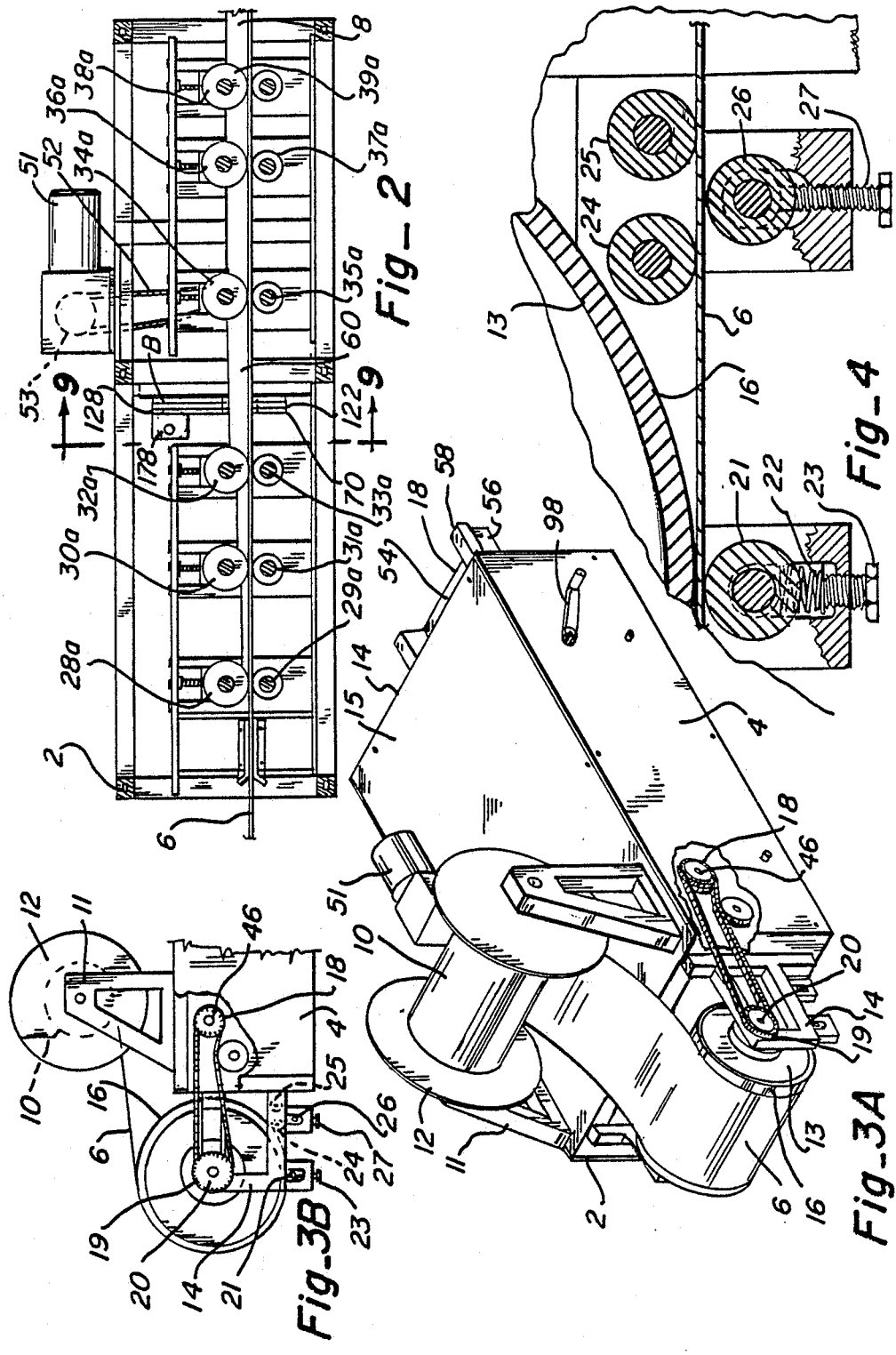

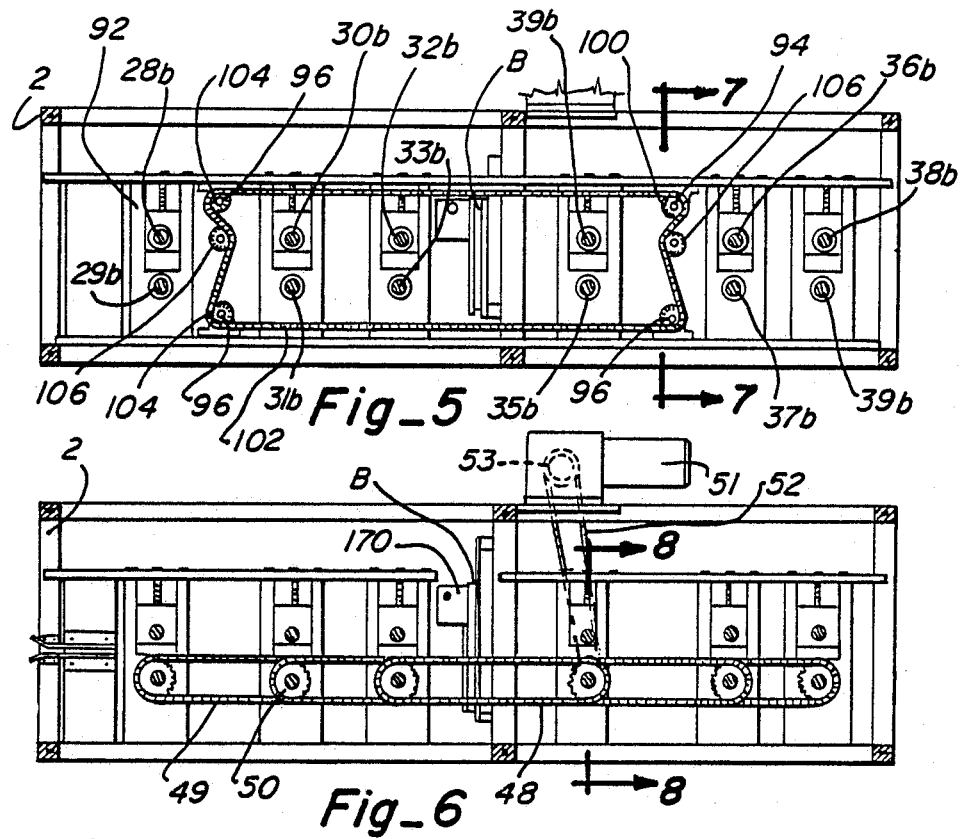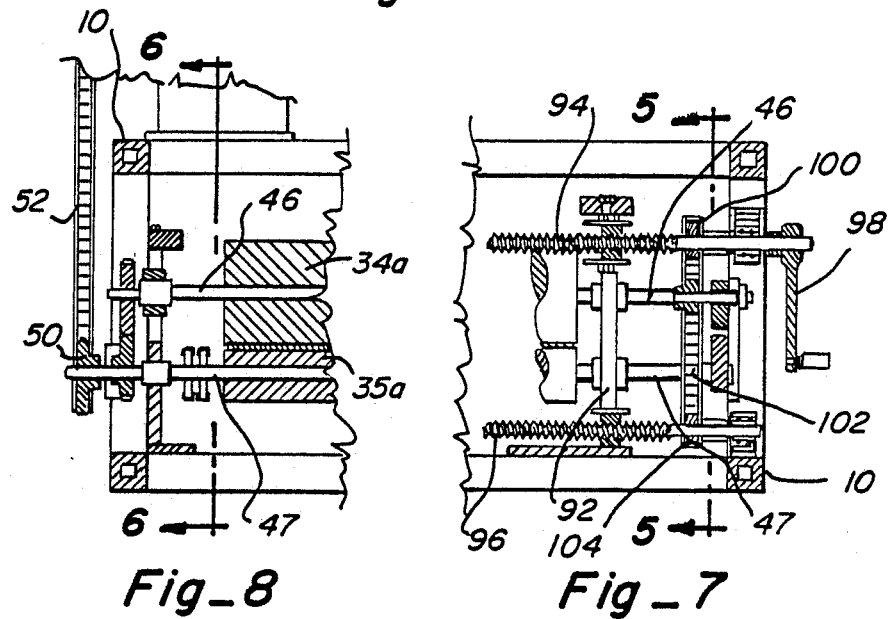

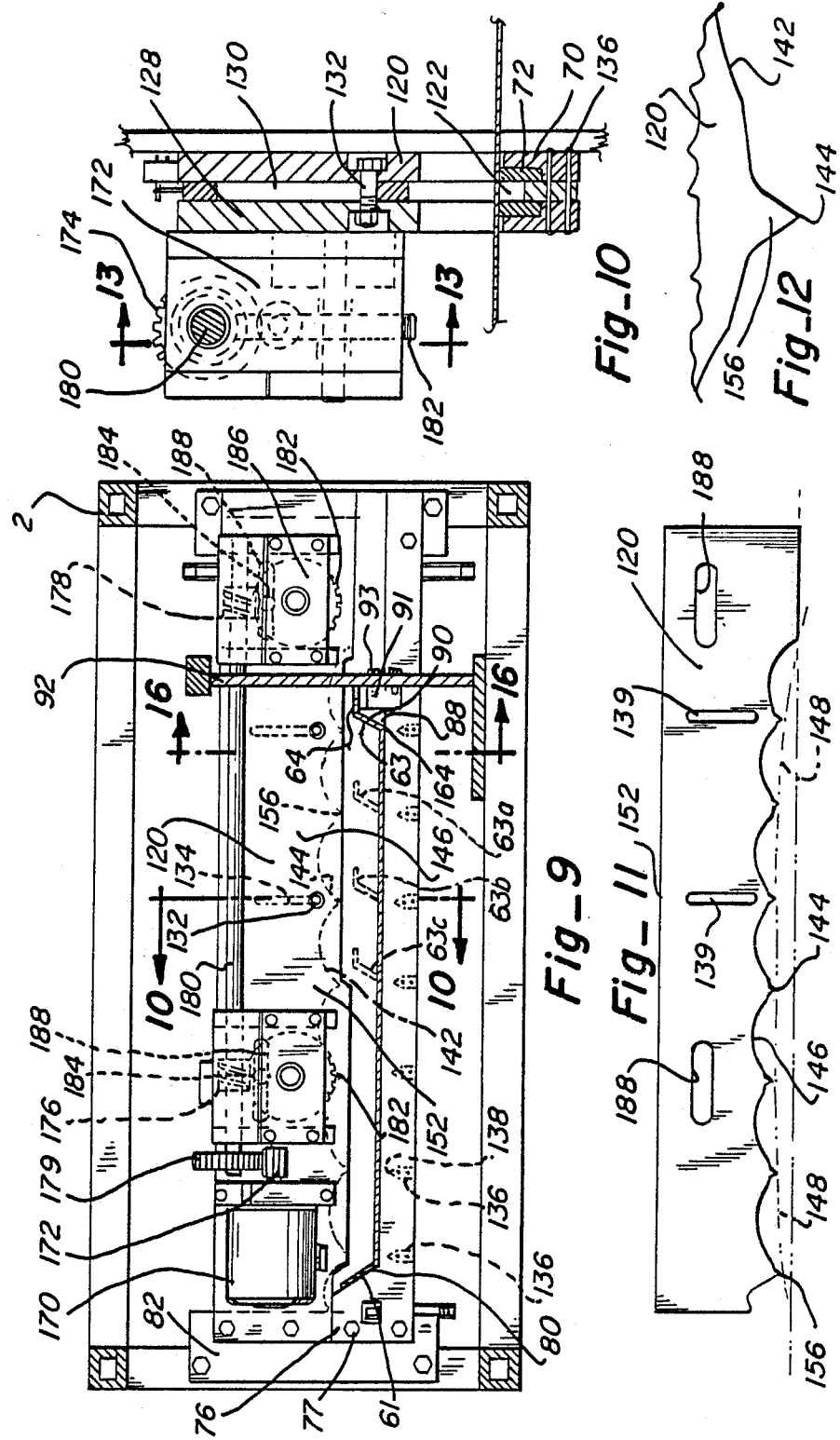

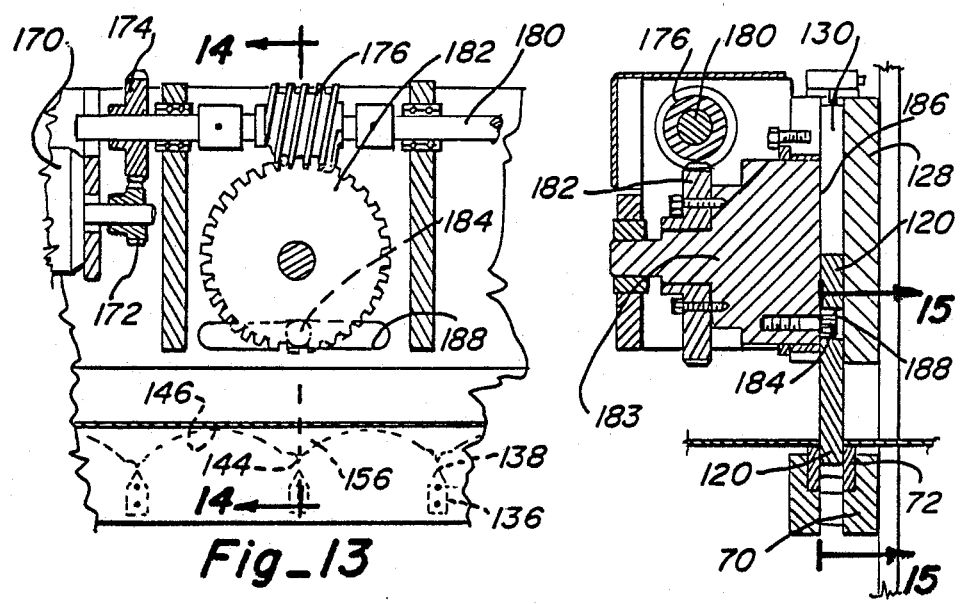
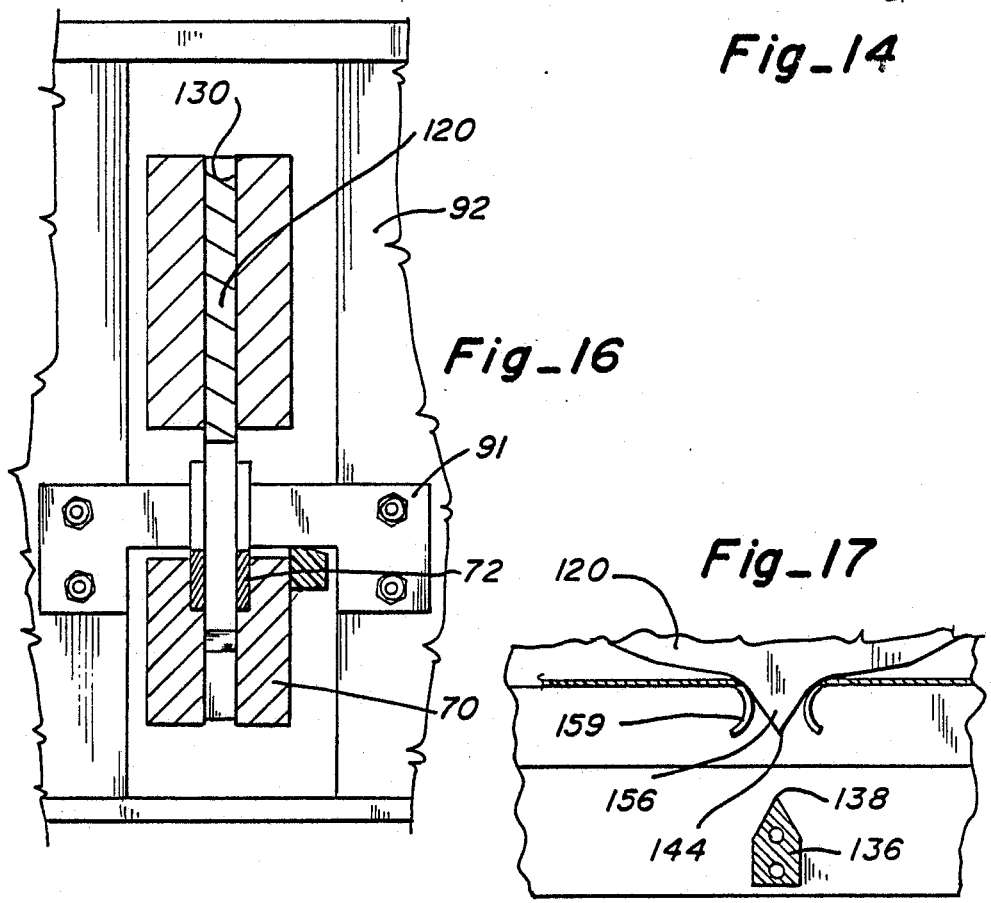

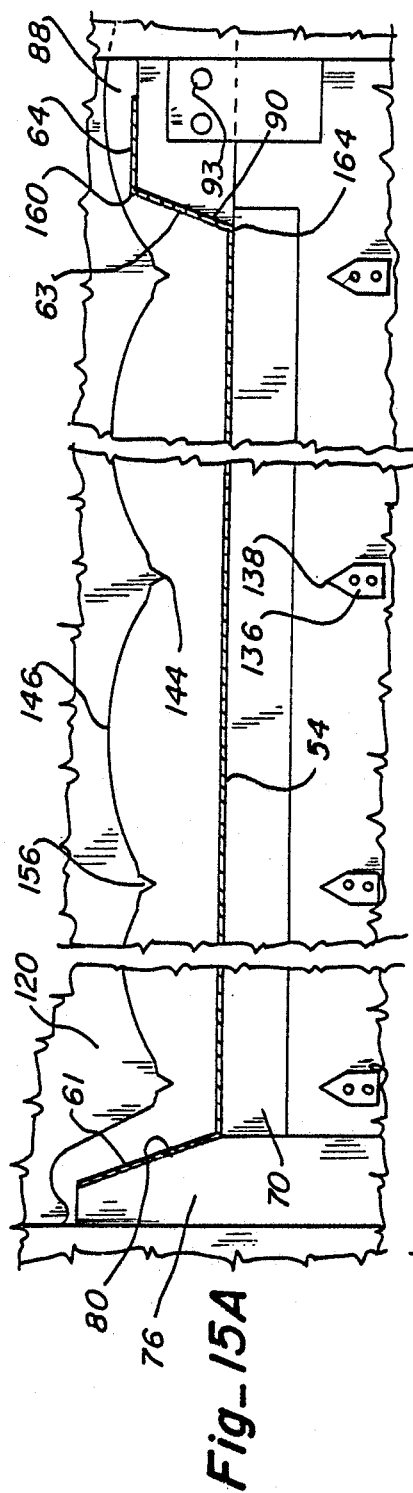

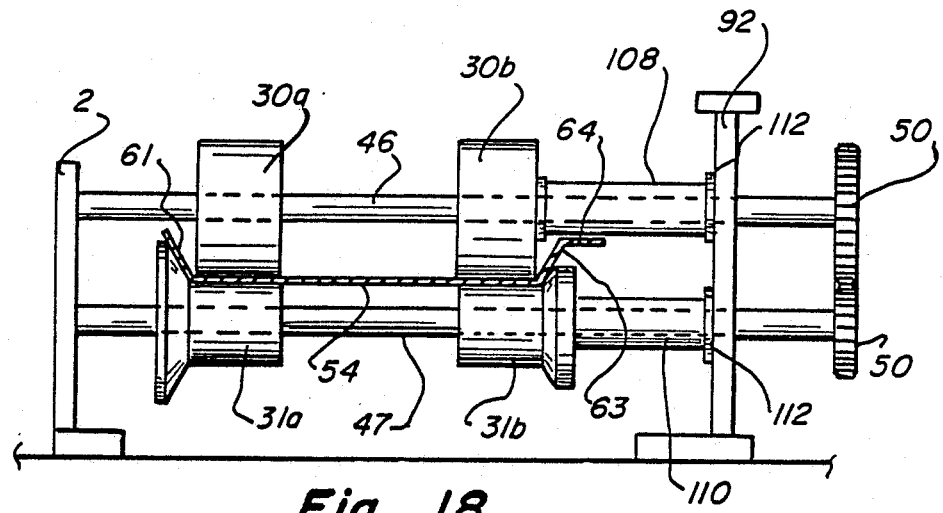
Fig_18
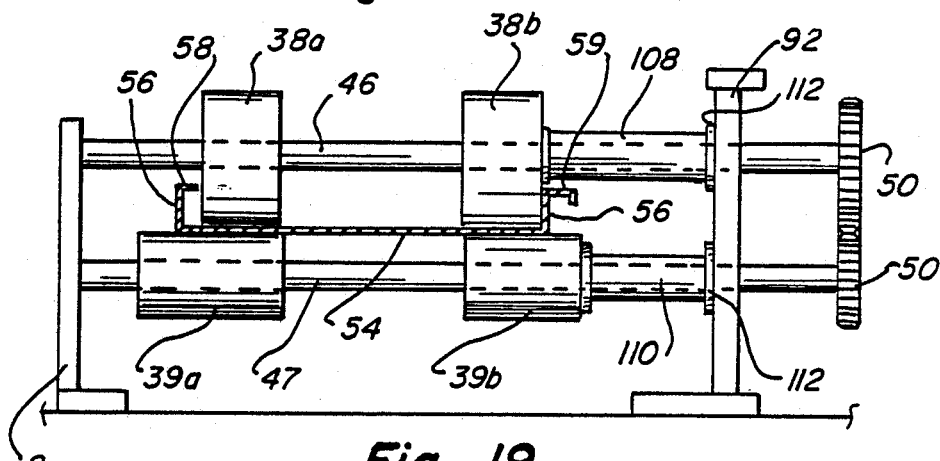
Fig_19

APPARATUS FOR MAKING PANELS

TECHNICAL FIELD

This invention relates to panel making apparatus, and more particularly to a novel and improved panel forming apparatus and a panel shearing apparatus preferably used in a combination in which the shearing operation is performed after an intermediate forming stage of the panel.

BACKGROUND ART

It is known in the art to make sheet metal panels at the use site from flat sheet metal, using a roll forming machine. Typically, the panel in its final form will be trough-shaped or generally U-shaped having a base and two vertical sidewalls extending from the sides of the base. One or both sidewalls usually have a lateral flange for joining two panels side by side to form a unitary assembly. Cutting a panel to the desired length has heretofore been accomplished by cutting either immediately prior to beginning the forming operation or immediately after the completion of the forming operation. A disadvantage of either method of cutting the panel is that the additional space required to perform the cutting operation will be approximately as great as that required for the entire forming operation itself. Another disadvantage of cutting the sheet metal prior to the forming operation is that this precludes automatic feeding of the sheet metal into the forming machine from a large roll of sheet metal, thereby wasting time by manually performing a task which could be done automatically. On the other hand, when the panel is cut after completion of the forming operation the vertical sidewalls and their lateral flanges present further problems. Shearing a fully formed panel having vertical sidewalls maximizes the length of the blade stroke required, thereby decreasing efficiency and precision in the cutting operation. In addition, because the sidewalls of a fully formed panel are generally vertical, they are particularly susceptible to crushing and tearing during a shearing process. One way to alleviate this problem has been to cut the formed panels by hand, but this solution is difficult and time consuming.

An additional problem with cutting the panel after the forming operation is that the force of the shearing action typically produces deformities in the panel near the cut. While these deformities may be rolled out during the forming operation if the cutting is performed prior to beginning the final forming, this is not possible if the panel is cut after final forming. In the latter case, such imperfections in the panel must either be accepted as they are or additional steps must be taken to smooth them from the panel.

A further problem with devices for shearing formed panels has been that generally only a single width and configuration of panel may be sheared by the device. This has been primarily due to the fixed dimensions and locations of the cutting support structures for the sidewalls and flanges. For example, U.S. Pat. No. 3,771,401 to Jasinski discloses a sheet metal shearing apparatus which provides a form-fitting structure to fully support all areas of the panel during the cutting operation, thereby protecting against deformation from pressures exerted by the shearing. However, the Jasinski apparatus requires a precise fit between the formed panel and the form-fitting support structure, and such precision may be difficult and time consuming to achieve and to maintain in on-site cutting operations. In addition, the Jasinski device is adapted to support sidewalls and flanges of a particular configuration, and is not suitable for different configurations. Furthermore, the Jasinski device is designed for cutting panels of one particular width, and i not adjustable to provide for cutting of panels over a range of widths.

When shearing sheet metal using a cutting blade which passes through the metal and between a pair of dies on which the metal rests, the stroke of the blade cuts out a narrow strip of metal along the length of the cut. This cut-out strip must pass cleanly between the dies and out of the path of the blade, or the accumulation of the strips between the dies will result in jamming of the cutting action. This problem has been solved in the prior art by undercutting a portion of the dies beginning just below their upper cutting surface, thus effectively widening the channel between the dies and increasing the clearance allowed for the cut out strip to pass through the dies. This solution is illustrated by the Jasinski apparatus, as well as by U.S. Pat. No. 4,218,946 to Witzler. The disadvantage of this approach is that widening the channel between the dies may also adversely affect the precision of the shearing action by allowing the stroke of the blade to deviate from a straight course.

DISCLOSURE OF THE INVENTION

In accordance with the present invention, an apparatus for making a panel is provided which includes a frame supporting a series of sets of upper and lower forming rollers positioned on laterally extending axles to provide a series of forming stations longitudinally spaced within the frame. The sheet metal passes between the sets of opposing rollers and is formed into a panel of a desired configuration. For a U-shaped panel having a base and two sidewalls extending from opposite sides thereof, the sidewalls are raised at each forming station to a position more closely approaching the vertical.

At an intermediate forming station which is preferably about half of the way through the apparatus, a partially formed panel is sheared to a selected length. For this purpose, a pair of spaced base dies is provided upon which the base of the panel rests during the shearing operation. At one end of the base dies is a pair of spaced first support dies which are upwardly inclined toward the vertical at an angle equal to the angle of incline of a corresponding partially formed sidewall. This pair of inclined dies serves to support the sidewall during cutting to prevent crushing due to pressures exerted on the panel by the shearing action. In like fashion, a spaced pair of second support dies is provided opposite the first support dies to prevent crushing of the other sidewall.

Preferably, the second support dies are laterally adjustable to provide for the shearing of a range of widths of panels. For this purpose the second support dies are mounted on a laterally adjustable side carriage. In similar fashion, sets of upper and lower forming rollers may also be mounted on the laterally adjustable side carriage on sheaths which are slidably moveable over the roller axles. With this arrangement, moving the side carriage to a selected lateral position will move both the second support dies and the moveable forming rollers into a position to accommodate panels of different widths. Additionally, the second support dies may be removably mounted to the side support to permit their replacement by support dies suitable for sidewalls of different dimensions and configurations.

A cutting blade is positioned to move vertically between a raised position above the dies to a lowered position between the dies. In passing between the dies with a swiping action, the blade shears the sheet metal panel. The blade edge has a series of concave serrations along its length, each serration terminating in an apex at both ends. In operation, these serrations provide a series of scissor-like "slicing" actions wherein the sheet metal is cut along a path beginning at the apexes and progressing to the center of the arc of the respective serrations. The shearing of the sheet metal produces cut-out strips which are allowed to fall downward and to pass through the dies. A sharpened tooth provided at each apex of the serrations will split the cut-out strip into shorter segments during the shearing operation, thereby allowing the strip segments to more easily pass through the die.

A novel drive system is provided for moving the cutting blade in a vertical reciprocating motion. A drive gear activates the system by turning a first worm gear which is connected by an axle to a second worm gear so that both worm gears rotate in unison. Power may be provided by an electric motor, although other power sources are possible, including manual power. Each worm gear drives a generally circular cam which has a cam follower protruding from one side. The cam follower fits into a horizontal slot on the blade, so that as the cam rotates the blade moves in a corresponding vertical reciprocating motion.

The foregoing and other features and advantages of the invention will be better understood from the following detailed description and the accompanying drawings.

BRIEF DESCRIPTION OF THE DRAWINGS

FIG. 1 is a perspective view of the forming and shearing apparatus showing flat sheet metal entering and a formed and sheared panel exiting the apparatus;

FIG. 2 is a cross-sectional view taken along line 2—2 of FIG. 1 showing the arrangement of the blade, die, and rollers;

FIG. 3A is a perspective view of the apparatus with side and top panels in place and showing the use of an automatic roll uncoiler;

FIG. 3B is a side elevational view showing the automatic uncoiler being driven by a drive sprocket connected to the axle of the first upper forming rollers;

FIG. 4 is a cut-away view of a portion of the unicoiler showing the operation of the spring-loaded levelling rollers;

FIG. 5 is a cross-sectional view taken along line 5—5 of FIG. 7 showing the lateral adjustment chain;

FIG. 6 is a cross-sectional view taken along line 6—6 of FIG. 8 showing the roller drive chain;

FIG. 7 is a cross-sectional view of the adjustment mechanism taken along line 7—7 of FIG. 5;

FIG. 8 is a cross-sectional view taken along line 8—8 of FIG. 6 showing the drive sprocket and rollers;

FIG. 9 is a cross-sectional view taken along line 9—9 of FIG. 2 showing the blade and the blade drive mechanism with a partially formed panel in shearing position;

FIG. 10 is a cross-sectional view taken along line 10—10 of FIG. 9 showing the blade, die, and drive system with a panel in place for shearing;

FIG. 11 is a front elevational view of the blade showing the cam following grooves, spacer grooves, and blade serrations;

FIG. 12 is a fragmentary side elevational view of a sharpened blade tooth;

FIG. 13 is a cross-sectional view taken along line 13—13 of FIG. 10 showing the position of the worm gear, cam, and cam follower with the blade in the lower position;

FIG. 14 is a cross-sectional view taken along line 14—14 of FIG. 9 showing the drive mechanism and a panel in position for shearing;

FIG. 15A is a broken cross-sectional view taken along line 15—15 of FIG. 14, with the blade in a raised position prior to shearing and showing the positions of the serrations and teeth relative to the partially formed panel;

FIG. 15B is a broken cross-sectional view taken along line 15—15 of FIG. 14, showing the successive piercing of the panel by the blade teeth with the slicing action of the serrations at various stages of completion;

FIG. 15C is a broken cross-sectional view taken along line 15—15 of FIG. 14 illustrating the completed shearing and showing the curved cut out strip segments passing between the die spacers;

FIG. 16 is a cross-sectional view taken along line 16—16 of FIG. 9 showing the relative positioning of the moveable dies and the base dies;

FIG. 17 is an isolated view of a portion of FIG. 15B showing a blade tooth piercing the sheet metal;

FIG. 18 is a front cross-sectional view at the second forming station showing a partially formed panel in relation to the forming rollers; and FIG. 19 is a front cross-sectional view of a fully formed panel in relation to the forming rollers.

DETAILED DESCRIPTION

Referring now to FIGS. 1-4, a panel making apparatus A includes a frame 2 having an upstream end and a downstream end, with optional cover panels 4 being used to enclose the apparatus A for safety purposes. Flat sheet metal 6 enters the frame 2 at the upstream end and a fully formed and sheared panel 8 exits at the downstream end. The sheet metal 6 may be fed into the apparatus A by hand or it may be fed continuously from a large roll 10.

Referring now to FIGS. 3A, 3B, and 4, there is shown a modification for feeding the sheet metal into the previously described apparatus A. A sheet metal roll 10 is supported on upright support rack 11 so that the sheet metal thereon is free to unwind from the spool 12 on which it is wound. An entry roller 13 is mounted on support structure 14 at the upstream end of the apparatus A so that the sheet metal coils around this entry roller 13 and into the entry feed guides 15 to be received by a first set of forming rollers. The entry roller 13 has a peripheral friction surface 16 which may be made of rubber, or of spaced rubber bands which may be provided on the periphery of the metal roller to contact and assist in moving the sheet metal. The entry roller 13 may rotate freely for smaller rolls of coil stock or may be power driven for larger rolls as required. The power driven or power assisted modification takes the power from the shaft 46 of the upper roller 28 of the first set of forming rollers. A chain 17 extends around a drive sprocket 18 and is coupled to a sprocket 19 on the shaft 20 of the entry roller 13 as seen in FIG. 3A. This synchronizes the movement of the entry roller 13 with the forming rollers. The purpose of the entry roller 13 is to keep the sheet metal from having coil set or kinks.

At the lower end of the entry roller 13 there is mounted a pressure roller 21 that is biased by a spring 22 mounted on an adjusting bolt 23. The sheet metal passes between the entry roller 13 and the pressure roller 21. This arrangement allows slipping of the sheet metal, while at the same time maintaining a uniform tension in feeding the sheet metal into the apparatus A. A further roller arrangement downstream of the pressure roller 21 comprises two spaced upper rollers 24 and 25 and a lower roller 26 between the two upper rollers with the sheet metal passing between the upper and lower rollers. The lower roller 26 is adjusted by means of a threshold bolt 27. The purpose of this roller arrangement is to take out oil canning effects and remove any coil set that might be present in the sheet metal.

In the apparatus A shown there is provided a series of six sets of upper and low rollers mounted on associated axles rotatably mounted to the frame 2. Proceeding from the upstream end toward the downstream end, these rollers are depicted as a first set of upper and lower rollers 28 and 29, a second set 30 and 31, a third set 32 and 33, a fourth set 34 and 35, a fifth set 36 and 37, and a sixth set 38 and 39. The upper rollers 28, 30, 32, 34, 36 and 38 are mounted on upper axles 46, with the lower rollers 29, 31, 33, 35, 37 and 39 being mounted in like fashion on lower axles 47. Each roller has a stationary roller portion and a laterally movable roller portion to facilitate the making of panels of different widths, with these portions being designated by the suffixes "a" and "b", respectively. The laterally moveable portions facilitate the making of panels of different widths by adjusting to a position suitable for forming a selected panel width. For this purpose, a laterally adjustable side carrier 92 is provided, having a first lateral adjustment drive screw 94 and three lateral adjustment guide screws 96. All the screws 94, 96 are rotatably mounted in the frame 10 and are threaded through side carriage 92. Hand crank 98 is directly connected to first adjustment screw 94 so that turning hand crank 98 rotates first adjustment screw 94. The turning of the hand crank 98 also rotates lateral adjusting gear 100 which is fixedly mounted on first screw 94. As adjusting gear 100 rotates, it drives lateral adjusting chain 102 which is meshed with transmission gears 104 mounted on screws 96, thereby rotating the screws 96 in unison with screws 94. Adjustable spring-loaded tension rollers 106 press against adjusting chain 102 to maintain tension in the chain. The rotation in unison of the four adjustment screws 94, 96 moves the side carriage 92 laterally in a controlled, uniform fashion.

Upper axle sheaths 108 and lower axle sheaths 110 are rotatably mounted to side carriage 92 by bearing mountings 112, and travel freely over upper axles 46 and lower axles 47 respectively as the side carriage 92 moves laterally. The moveable roller portions are mounted on the respective axle sheaths 108 and 110, allowing the rollers to be laterally adjusted to accommodate a wide range of panel widths. The carriage 92 is thus continuously adjustable within its range of motion. However, due to industry standards, the carriage 92 will in practice generally be adjusted only to accommodate panel widths of twelve, sixteen, twenty and twenty-four inches. The twenty-four inch panel width is shown in FIG. 9 by the position of flange 63, while the twenty, sixteen, and twelve inch widths are indicated as flanges 63a, 63b, and 63c, respectively. In addition, certain restrictions will be discussed in connection with the shearing interaction of the blade and the panel which effectively preclude certain side carriage settings for a particular selected panel width.

The lower forming rollers 29, 31, 33, 35, 37, 39 are driven by drive train 48 including transmission chain 49 meshing with transmission gears 50. The drive train 48 is powered by electric motor 51 through motor drive chain 52 connected to a drive gear 53. As best seen in FIGS. 18 and 19, when the sheet metal 6 passes between the opposing sets of rollers, the pressure exerted on the sheet metal 6 by the opposing sets of rollers forms the sheet metal 6 into a fully formed panel 8 including a base 54 and two upstanding sidewalls 56, 57 having lateral flanges 58 and 59. The forming of the panel 8 is accomplished at several forming stations, with each successive pass between sets of rollers at a forming station bringing a partially formed panel closer to its final shape. For example, at an intermediate forming station the partially formed panel has a first inclined sidewall 61 rising from base portion 54, and a second inclined sidewall 63 rising from the base 54 and having partially formed flange 64 extending laterally therefrom. The position of the sidewalls 61 and 63 more closely approaches the vertical with each forming stage.

Referring to FIGS. 9–12, a shearing assembly B is provided near the longitudinal center 66 of the frame 2 for shearing a partially formed panel. By performing the shearing at an intermediate stage of the forming process, the inclined sidewalls 61, 63 will be sufficiently far from the vertical to greatly reduce the likelihood of crushing during shearing, as would be likely if vertical sidewalls 56, 57 were subjected to downward vertical shearing pressure. In addition, the inclined sidewalls permit a shorter blade stroke to be used than would corresponding vertical sidewalls, with resulting improvement in efficiency and accuracy of the shearing action. For example, a blade stroke of no greater than two inches is possible for intermediate shearing of a panel having a final vertical sidewall of 1½ inches. Shearing assembly B includes a spaced pair of base dies 70 which support the panel 60 during shearing. A hardened lip 72 extends along the upper portion 74 of each base die 70 to provide extra durability of the die to enable the dies 70 to better withstand the long-term stresses which can be generated by the shearing operation. A spaced pair of first support dies 76 is provided at a first lateral end 78 of base dies 70. Each of the support dies 76 has inclined portion 80 which is upwardly inclined at an angle corresponding to the incline of the first sidewall 61 for supporting the sidewall 61 to prevent crushing during shearing. First support dies 76 are removably attached to side support strut 82 by means of retaining bolts 77.

A spaced pair of second support dies 88 each having inclined support portion 90 is provided at a second end of base dies 70 to prevent crushing of the second sidewall 63 during shearing. This pair of second support dies 88 is mounted to die mount 91 which is removably mounted to laterally adjustable side carrier 92 by retaining bolts 93 to accommodate different widths and shapes of panels. By removing one pair of second support dies 88 and bolting in place another pair having a different configuration or different dimensions, the desired support during shearing may thus be attained for a variety of panel shapes and sizes.

A cutting blade 120 for shearing the panel 60 is provided in vertical alignment with the space 122 between the dies 70, 76, 88. The blade 120 is moveable vertically back and forth from a raised position 124 above the space 122 to a lowered position 126 within the space 122, as best seen in FIGS. 9 and 15. Blade supports 128 attached to the frame 10 define a channel 130 in which the blade 120 travels. Adjustable tolerance bolts 132 extend between blade supports 128 to regulate the space therebetween and maintain a tight fit with the blade 120. This tight fit helps to hold the blade 120 on a straight path, thereby allowing a precise cut to be achieved. In addition, in its downward path, the blade 120 first enters space 122 between support dies 76, 90. As the blade continues to move downward, the support dies 90 then act to guide the blade 120 into the space 122 between base dies 70. The bolts 132 pass through slots 134 in the blade 120, which allows the blade 120 to freely travel over the bolts 132 during the shearing action. In similar fashion, die spacers 136 each having a sharpened upper portion 138 operate to maintain a tight tolerance between the blade 120 and the base die 70, thereby eliminating the need for external support of the dies 70.

To provide efficient and accurate cutting, the blade 120 has a series of concave arcuate serrations 140 each including an arc 142 culminating at either end in an apex 144 and having a center 146. As the blade 120 moves vertically down, each serration 140 engages the panel 60 first at the apexes 144 of the serration 140 and then at successive points on the arc 142 until the arc center 146 is reached. This results in a "slicing" action of the blade 120 on the panel 60 which is more efficient and produces a neater cut than a "chopping" action in which each point on the blade engages the panel 60 at the same time. As shown in FIG. 11, the blade serrations themselves are also arranged along a slightly concave arc 148 so that in the vertical cutting motion, serrations 140 closer to the lateral ends 150 will contact the panel 60 before serrations of the blade closer to the center 152 of the blade 120. Since cutting of the panel 60 thus occurs sequentially along its width toward the center of the panel, the required cutting force at any one time is minimized, thereby providing a more efficient cutting action and a neater cut.

Shearing of the panel 60 produces a cut-out strip 154 which falls into the space 122 between the base dies 70. A sharpened tooth 156 provided at the apexes 144 of each blade serration 140 assures that the strip 154 is cut into a series of smaller segments 158. To avoid jamming of the cut out strips 154 in the space 122, the teeth 156 are positioned in vertical alignment with the die spacers 136 so that the cut out strip 154 is cut at points along its length directly above the die spacers 136. The resulting strip segments 158 are therefore optimally positioned to fall between the die spacers 136 and out of the apparatus A. Due to the combination of piercing and shearing forces exerted by the sharpened tooth 156 and the arcuate serrations 140 respectively, the strip segments 158 tend to curl under at their ends 159, thus effectively shortening their length and further facilitating their passing between the die spacers 136 and out of the apparatus A. This curling effect is advantageous in any use of the blade 120 to shear sheet metal and is not limited in usefulness to the specific application herein described.

In cutting along the base 54, the tooth 156 will always pierce the panel 60 first, followed by a scissoring action as successive points along the arc 142 of each serration ing either of the sidewalls 61, 63 the arc 146 will generally engage the sidewall at its highest point 160 first, followed by a scissoring action outward from the point of contact 162 on the arc 146. Therefore, it is important that the last tooth 156 to contact the base 54 does so in such a way that the tooth 156 completes its piercing action before the scissoring action is completed on the adjacent sidewall 61, 63. If said piercing action is not completed before completion of the scissoring action, the cut out strip 154 will not be cut into segments as required to avoid jamming. This unwanted situation may occur if the last contact tooth 156 is aligned to strike the panel 60 at a point on the base 54 too close to the intersection 164 of the sidewall 61, 63 and the base 54. In practice, it is found that this may be avoided if the tooth 156 is aligned to engage the panel 60 at a distance approximately one inch or more from the intersection point 164. The precise distance varies with the shape of the serrations 140 and with the configuration of the panel 60. A result is that a variety of panel widths and sidewall heights and configuration may be cut on a single lateral setting of the side carriage 92, provided only that the piercing functions of the teeth are properly performed within the constraints discussed above.

Reciprocating vertical action of the cutting blade 62 is provided by a blade drive system C. An electric motor 170 is the preferred power source, although other sources of power may be utilized, including manual power. Motor gear 172 activates drive gear 174 which turns a first worm gear 176. A second worm gear 178 is connected to the first worm gear 176 by axle 180, so that the two worm gears will rotate in unison. Each worm gear 176, 178 drives a generally circular gear 182 on a gear shaft 183. Gear 182 carries a cam follower 184 extending from one side 186 adjacent the outer periphery of the gear 182. The cam follower 184 fits into an elongated horizontal cam follower slot 188 on the blade 120, so that as the cam follower 184 moves in a generally circular path, the blade 120 is propelled in a reciprocating vertical path. By way of illustration, when the cam follower 184 is at its uppermost position as seen in FIG. 9, the blade 120 is also at its uppermost position. Conversely, when cam follower 184 reaches its lowest position, blade 120 is also at its lowest position.

This invention has been described in detail with reference to a particular embodiment thereof, but it will be understood that various other modifications can be effected within the spirit and scope of this invention.

I claim:

1. Apparatus for making and cutting a panel comprising:

a frame;

a plurality of sets of upper and lower forming rollers at spaced intervals along and within said frame for shaping a generally flat sheet into a panel having a base and at least one sidewall extending from a side of the base, each lower roller of each set having a first lower roller portion and a second lower roller portion that is movable laterally relative to the associated first lower roller portion to form panels of different widths, said upper roller of each set having first upper roller portion and a second upper roller portion that is movable laterally relative to the first upper roller part to form panels of different widths;

a pair of spaced base dies for supporting said panel;

a cutting blade movable between a first position and a second position past and in cooperation with said side support and base dies to shear said panel; and a laterally moveable side carrier to which said movable roller portions are mounted for lateral movement of said movable roller portions to form panels of different widths and to which said pair of spaced side support dies are mounted for lateral movement of said side support dies relative to said base dies for supporting panels of different widths during said shearing, said movable roller portions and said spaced side support dies being moved simultaneously upon movement of said laterally movable side carrier.

2. Apparatus as claimed in claim 1, further including:

a plurality of lateral adjustment screws rotatably mounted to a support frame and threaded through said side carrier;

gear means fixedly mounted to each screw, said gear means being interconnected by transmission means to rotate in unison; and means for rotating a selected one of said lateral adjustment screws to rotate all of said screws in unison to laterally move said side carrier.

3. Apparatus as set forth in claim 1, further including:

supply means for delivering a flat sheet from a supply roll to said panel forming rollers; and a freely rotating entry roller over which said sheet is passed from said supply means to avoid kinking of the sheet.

4. Apparatus as set forth in claim 1, further including:

supporting means for delivering a flat sheet from a supply roll to said panel forming rollers;

an entry roller over which said sheet is passed from said supply means to avoid breaking off the sheet; and means for driving said entry roller in synchronism with said forming rollers.

5. Apparatus as claimed in claim 3, further including:

an adjustably pressure roller adjacent and opposed to said entry roller, said sheet passing between said entry roller and said pressure roller to maintain tautness in delivering said sheet to said panel forming rollers.

6. Apparatus as claimed in claim 3, further including:

two spaced rollers between said entry roller and said forming rollers; and an adjustably biased roller adjacent to and opposed to said spaced rollers, said sheet passing between said spaced rollers and said biased roller to remove wrinkles from said sheet.

7. Apparatus as claimed in claim 1, said blade and dies being located downstream of a selected of said sets of upper and lower forming rollers, said blade including a cutting edge having at least one serration extending along a concave arc with the ends of the arc terminating in apexes that are first to pierce the panel followed by a scissor-like cutting as the cutting blade is advanced, said arc providing a shearing action for sidewalls of different dimensions and different shapes.

8. Apparatus as claimed in claim 1 wherein there are four sets of upper and lower forming rollers and wherein said blade and dies are located downstream of a second set of upper and lower forming rollers.

* * * * *